Jan. 1, 1935.   H. C. EDWARDS   1,986,564
INTERNAL COMBUSTION ENGINE
Filed Jan. 17, 1931   3 Sheets-Sheet 1

Inventor
HERBERT C. EDWARDS.
By
Attorney

Jan. 1, 1935. H. C. EDWARDS 1,986,564
INTERNAL COMBUSTION ENGINE
Filed Jan. 17, 1931 3 Sheets-Sheet 2

Inventor
HERBERT C. EDWARDS.
By
Attorney

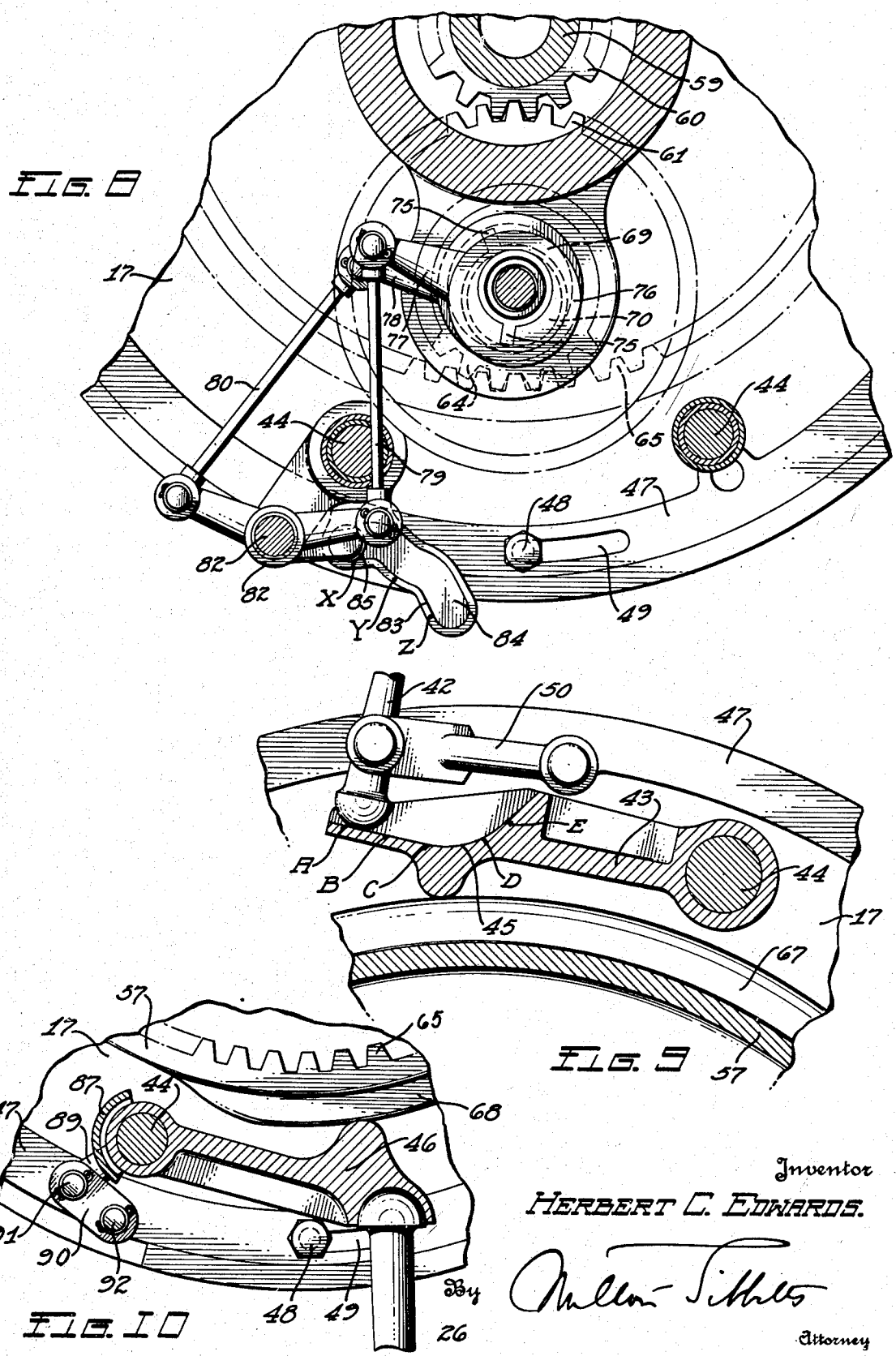

Patented Jan. 1, 1935

1,986,564

UNITED STATES PATENT OFFICE 1,986,564

INTERNAL COMBUSTION ENGINE

Herbert C. Edwards, Detroit, Mich., assignor to Packard Motor Car Company, Detroit, Mich., a corporation of Michigan Application January 17, 1931, Serial No. 509,323

9 Claims. (Cl. 123—139)

This invention relates to internal combustion engines and more particularly to engines in which fuel oil charges are injected into the combustion chambers.

One manner of introducing oil charges into the combustion chambers of internal combustion engines is to employ a device in which a plunger is reciprocated by an engine driven mechanism to trap oil and create sufficient pressure behind the same to discharge a portion thereof past a pressure resisting valve in a nozzle. In such devices, the distance the plunger moves after closing the oil inlet determines the volume of oil discharged from the nozzle, the developed pressure depends upon and varies with the speed of the plunger movement and the timing of the injections is determined by the closure of the pump inlet ports relative to the crank shaft angle.

The use of separate controls to regulate the length of the effective strokes of the plunger and to vary the time of its closing the oil inlet have heretofore been proposed. A single control for regulating both the effective plunger stroke and its movement past the oil inlet port has also been employed, and is preferable to the separate controls with many power plants such as those employed with aeroplanes where the pilot has several other controls to manipulate. With single controls of this nature, with which I am familiar, the timing is advanced with the increase in the fuel charge volume, and advanced timing is a disadvantage when starting an engine of the Diesel type because late timing is requisite to the development of heat to cause ignition.

The slow turning of the engine while being started causes a correspondingly slow plunger movement and the consequent pressure developed behind the fuel is not sufficient to project the charges sufficiently into the combustion chambers to cause a commingling which will produce a mixture of a character which will readily ignite. To overcome this condition it has been previously proposed to employ mechanism for driving the plunger at a faster rate of speed, relative to the crank shaft rotation, when starting than when running. The mechanisms for increasing the plunger speed in this respect have heretofore been controlled independently of the mechanism for regulating the oil charge volume and the injection timing.

An object of this invention is to provide an engine, of the character referred to, in which a single control member actuates mechanism for regulating the timing, the volume of oil in delivered charges and the pressure under which the charges are delivered so that in starting the engine there is a full volume charge delivered late in the compression cycle and under a high pressure.

Another object of the invention is to provide an engine of the type referred to in which fuel injection timing is shifted through regulation of the plunger actuating mechanism by the operation of the control mechanism for regulating the effective injection stroke of the plunger.

A further object of the invention is to provide an internal combustion engine in which engine driven fuel injection plunger actuating mechanism is regulated through the adjustment of a single control means movable in a limited range to cause the timing of the injections to vary in accordance with the charge volume variance while running under its own power, and to cause a late timing and maximum volume of the charge under high pressure while starting.

Another object of the invention is to provide regulating mechanism for controlling fuel charges injected into engines so that the condition thereof is most suitable for efficient running and quick starting.

Other objects of the invention will appear from the following description taken in connection with the drawings, which form a part of this specification, and in which:

Fig. 8 is a fragmentary sectional view showing the gear shifting mechanism associated with the control ring;

Fig. 9 is a fragmentary sectional view showing one of the fuel plunger actuating mechanisms;

Fig. 10 is a fragmentary sectional view of one of the valve actuating mechanisms and the connection between the timing control mechanism and the control ring.

Figure 1:
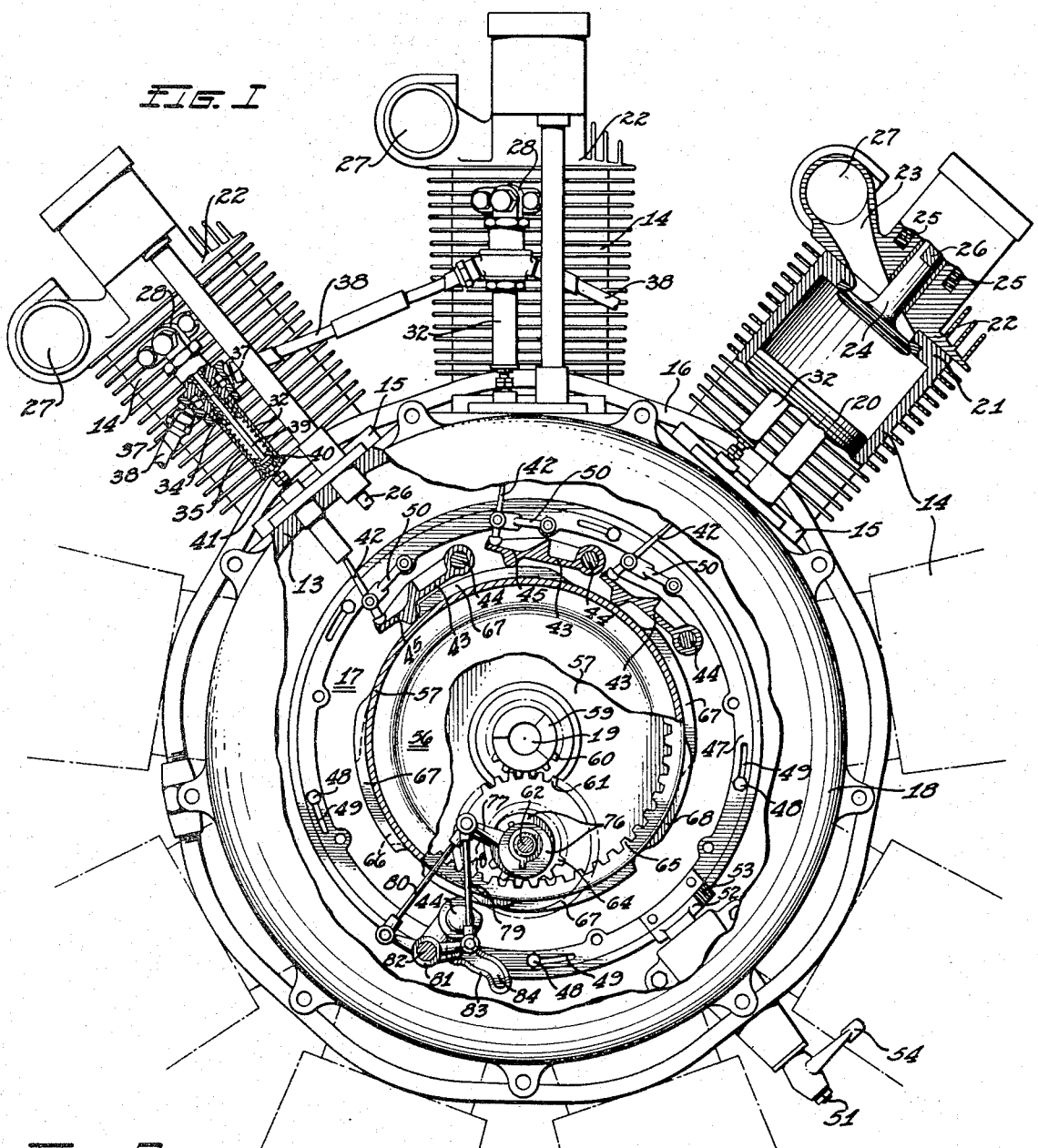
Fig. 1 is a rear elevational view of a radial engine, with parts in section and parts broken away, having my invention associated therewith.
Figure 2:
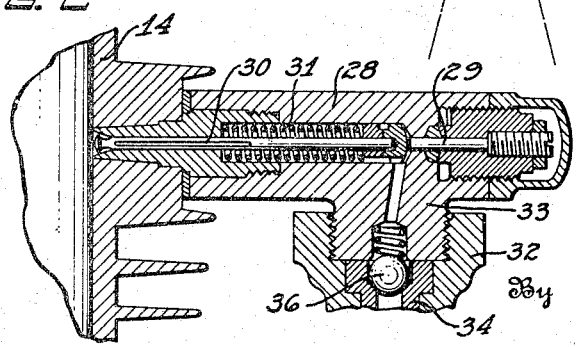
Fig. 2 is a sectional view of the nozzle portion of one of the fuel injection devices.
Figure 5:
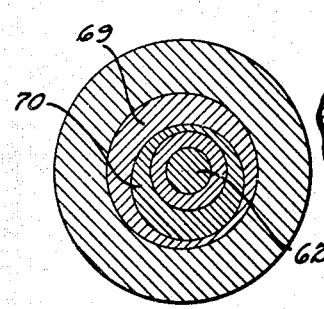
Fig. 5 is a sectional view taken on line 5—5 of Fig. 3.
Figure 3:
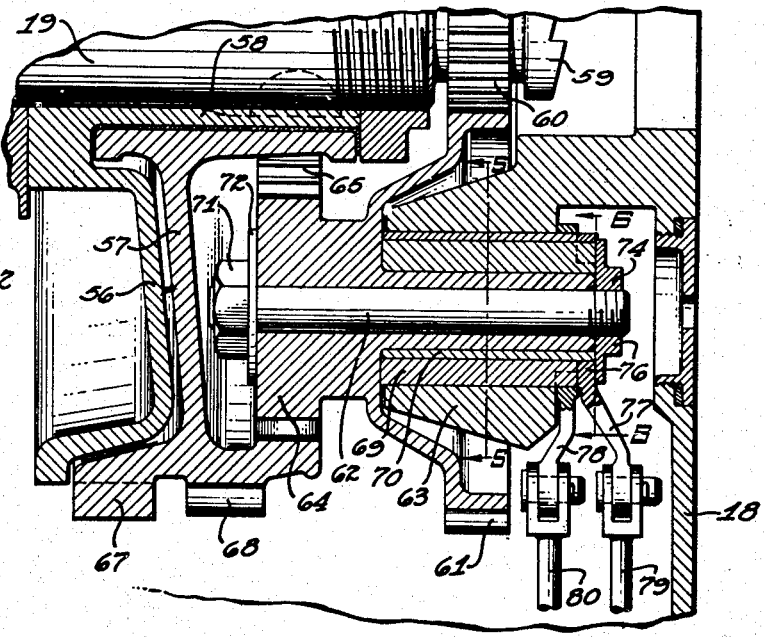
Fig. 3 is a fragmentary sectional view showing the reduction cam drive gearing and the control of shifting one of the gears.
Figure 6:
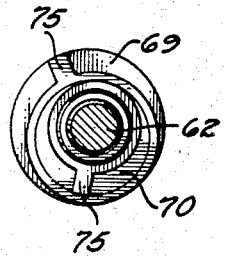
Fig. 6 is a sectional view taken on line 6—6 of Fig. 3.
Figure 4:
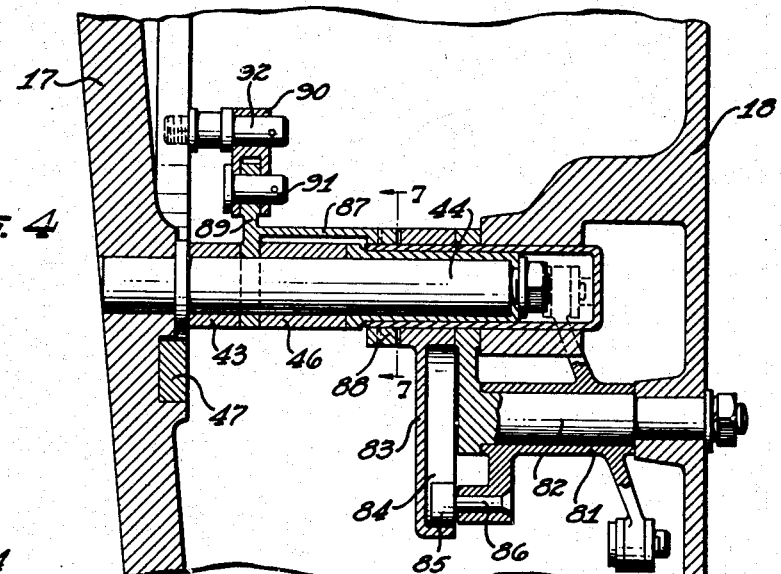
Fig. 4 is a fragmentary sectional view showing the mechanism for shifting the mounting of the movable reduction gear.
Figure 7:
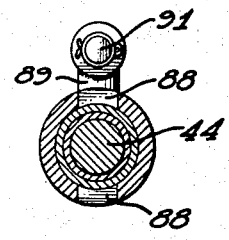
Fig. 7 is a sectional view taken on line 7—7 of Fig. 4.

Referring to the drawings by characters of reference, 13 represents the crank case of an internal combustion engine from which a plurality of cylinders 14 extend radially. The cylinders are each formed with oppositely disposed flanges 15 secured against the peripheral wall of the crank case by a pair of tension band means 16 which also place the crank case in compression. Walls, one of which is indicated at 17, extend transversely of the crank case and reinforce it interiorly, and the open rear end of the case is closed by the cover 18. Crank shaft 19 extends axially through the case and transverse walls and is carried by suitable bearings in the transverse walls 17.

Pistons, as indicated at 20, are connected in the usual manner with the crank shaft by a master rod assembly (not shown). The cylinders each include an integral head 21 and a dome 22, and a single Venturi port 23 extends through the head and dome at an angle to the cylinder axis and tangentially of the inner wall of the cylinder causing air charges, drawn through the port on the piston suction stroke, to rotate spirally in the cylinder. A valve 24 controls the inner end of each port and is held closed during the compression and working strokes of the pistons by springs 25 and is held open during the exhaust and suction strokes of the piston by the usual push rod and lever structure, a portion of which is indicated at 26. An open conduit 27 is arranged transversely of the outer end of each port and communicates therewith.

An individual injection device is associated with each of the cylinders for projecting atomized oil charges under high pressure into the compressed rotating air charges in cylinders. The nozzle consists of a casing 28, bolted to the cylinder, having an axially extending chamber communicating with the interior of the cylinder, a stop member 29, a valve 30 and a spring 31 exerting pressure against the valve member to urge it against the stop member. The stop member is adjusted so that the valve head will not quite close the outlet end of the chamber. A pump casing 32 is screwed upon the neck 33 of the nozzle and carries a plunger barrel 34. A passage extends through the nozzle neck establishing communication between the barrel and the nozzle chamber and a one-way valve 36 prevents back flow of oil from the nozzle to the barrel. The barrel and its casing are provided with aligned openings 37 and a housing is secured around the casing openings, the adjacent housings being connected by conduits 38 which constitute an oil supply manifold for the several injection devices. The manifold is connected with a reservoir and a low pressure pump (not shown) for moving oil through the openings 37 into the pump barrels of the injection devices, the spring pressed ball valves 36 preventing leakage of such oil into the nozzles except when the plungers 39 are moving in their injection stroke after closing the ports 37. A plunger 39 reciprocates in the barrel and has an enlarged end 40 which is guided in the pump casing.

The plungers are reciprocated by a spring 35 and adjustable mechanism. Such mechanism includes an articulated push rod structure, including a section 41, which engages the plunger head and extends through a guide into the crank case, a movable section 42, and a rock lever 43 which is pivoted upon a shaft 44 extending between the end cover and the adjacent wall 17. The free end of the rock lever is formed with a curved surface 45 upon which the rod section 42 bears and is longitudinally adjustable. A rock lever 46 is also mounted upon each of the shafts 44 and the valve push rods 26 of the valve mechanism of each cylinder are connected to the free end of one of such rock levers. When the openings 37 are uncovered by the plunger, oil is moved from the manifold into the space in the device beyond the plunger, and when the plunger is moved so that it closes the openings the oil is trapped in the device and is displaced or projected from the nozzle in a volume depending upon the plunger stroke following closing of the ports. Adjustment of the plunger stroke will vary the volume of the oil charge delivered, or will keep the openings 37 uncovered in which event the engine will receive no fuel.

The plunger stroke is regulated by control mechanism which is manually operated. A ring 47 is carried by the bolts 48 extending through slots 49 therein and fixed to the wall 17. A link 50 is pivoted to each of the push rod sections 42 and to the ring so that rotation of the ring will adjust the sections along the curved faces of the associated rock levers. In order to rotate the ring, a shaft 51 extends through the crank case and carries a gear segment 52 which meshes with the rack 53 on the ring, and suitable rod means (not shown) can be associated with the arm 54 fixed to the shaft for rotating and keeping the same in adjusted position at a point distant from the engine. As shown in Fig. 9, the curved slipper face with which the push rod engages extends in a gradual curve from the free end past the middle and then in an abrupt curve toward the pivoted end. When the ring 47 is moved to the extreme position in one direction, as shown in Figs. 8 and 9, the push rods will engage the curved surface at the free end of the rock levers at a point indicated at A and in this position there will be a stroke of the push rod to move the plungers to their extreme position beyond the openings 37, thus delivering maximum oil charges when the rock levers are lifted. When the push rod is associated on the rock lever between the points A and B, the plungers will be moved past the openings 37 to deliver charges which will deliver cruising charges when the engine is used with aeroplanes. When the push rod is between the points B and C the charges delivered by the plunger action will cause the engine to idle, and when between C and D the plungers will not close the openings 37. When the ring 47 is moved to its extreme position, opposite that shown in Fig. 8, the push rods will engage the abruptly curving end of the curved rocker face as indicated at E in Fig. 9 whereupon the plungers will move past the openings 37 the same distance as when the rod is at A, thus delivering the maximum fuel charges. It will be seen that in each extreme position of adjustment the push rods will cause the plungers to deliver a maximum volume of oil into the cylinders.

The fuel rock levers are moved in their effective fuel delivery strokes by a pair of cam means which are driven from the engine at relatively different speeds. One cam 56 is fixed to the crank shaft while the other cam 57 is rotatably mounted upon the extended hub portion 58 of the fixed cam. A jaw extension 59 is fixed to the rear end of the crank shaft and has a gear 60 fixed thereto which meshes with an idler gear 61 carried by the stub shaft 62 mounted in the boss 63 of the rear cover. Another gear 64 is formed integral with the gear 61 and meshes with an internal gear 65 on the cam 57. Such gearing is of a reduction character and is arranged, in this instance, to rotate the cam 57 at one-eighth crank shaft speed and in a reverse direction to the crank shaft rotation. The faster cam has a single lobe 66, while the slower cam has four lobes 67, and the cams both rotate so that they will raise the fuel rock levers 43 as they pass thereby. Due to the timing, the length of the lobes and the relative timing under all operating conditions, only one of the cams is effective at a time because the lobes of the effective cam will hold the rock levers raised until the lobes of the other cam are under the same. The cam 57 is also provided with lobes 68 which actuate the rock levers 46 for operating the valve actuating mechanism.

In order to vary the timing of the fuel injections I provide a movable mounting for the idler gear of the reduction gearing for rotating the slower cam, the shifting or control mechanism for this purpose being connected with and operated in a definite relation with the fuel control ring 47. A pair of telescoping eccentric members 69 and 70 are mounted in the boss 63, and the gear hub and shaft 62 are carried by the inner eccentric. The eccentrics are of different form and designed so that when rotated in opposite directions the center of the gear hub carried thereby will be moved in an arc approximately corresponding to the circle of the cam gear 65, and therefore the gear 64 can be regulated in its relation with the cam 57 to control the position of the lobes thereon in their rotation relative to the lobe on the cam 56 and the crank shaft angle or the compression stroke of the pistons. The relative eccentricity of the telescoping bearing members 69 and 70 is different and of a character such that the pinion 64, supported by the inner bearing member, will follow a curved path which is substantially the same as the pitch radius of the gear 65, at least for a movement necessary to obtain the required adjustment of the timing range.

As before stated the eccentrics are regulated through mechanism connected to the fuel control ring 47. A nut 71 is screwed upon the front end of the shaft 62 and a washer 72 engages the end of the hub of the gear 64. A nut 74 is screwed upon the rear end of the shaft 62 and retains the eccentrics in an axial relation and the gear structure 61 and 64 axially with relation to the boss 63. The rear ends of the eccentrics are formed with end bosses 75 which are engaged by heads 76 on the arms 77 and 78, such arms having rods 79 and 80 respectively pivotally connected therewith. The rods are also pivotally connected to oppositely disposed arms on the rocker member 81 which is rotatably mounted upon a stub shaft 82 carried by the rear crank case cover and fixed through the medium of an end flange through which one of the stub shafts 44 extends. Upon this stub shaft is rotatably mounted a cam member 83 having a cam groove 84 formed in the side facing the shaft 82, and a roller 85, carried by a shaft 86, is arranged in the cam groove, the shaft 86 being fixed to the front flanged end of the rocker member 81. A yoke 87 is rotatably mounted upon the shaft 44, which carries the cam member, and adjacent ends of the yoke and the cam member are formed with interengaging driving teeth 88. At the front end of the yoke is an arm 89 to which a link 90 is pivoted by the pin 91, and the link is also pivotally mounted upon a pin 92 which is fixed to the fuel control ring 47.

The cam groove 84 is formed with three connecting curved segments X, Y and Z which extend in three directions so that the association of the roller in the different parts of the groove will rotate the member 81 in directions which will rock the lever 81 to shift the eccentrics. With the roller 85 in the portion X of the groove, the slower cam will be effective at the earliest predetermined time during the compression stroke. With the roller in the Y portion of the cam groove the injection timing is later in the air compression stroke than when in the X portion of the groove and as the push rod is moved toward the Z portion of the groove the timing is gradually retarded. When the roller is in the X and Y portions of the cam groove, the lobes of the slow cam are effective and will mask the fuel rocker levers from the fast cam, but when the roller is in the Z portion of the cam groove the slow cam is moved so that the lobes thereon reach the fuel rocker levers after they have been raised by the fast cam 56 and the fast cam is fixed with the crank shaft to provide late timing for the fuel injections. When the control ring is in the extreme position of adjustment, as shown in Fig. 8, the push rods will be located on the rocker levers as shown in Fig. 9 and giving the fuel plungers a maximum stroke after closing the ports 37, and at the same time the roller is in the X portion of the cam groove which produces the earliest timing of the fuel injections during the compression strokes of the pistons. As the fuel ring 47 is adjusted clockwise, viewed from the rear of the motor as in Fig. 8, the push rods move along the rock levers toward the pivoted ends and reduce the fuel charge volume while at the same time the cam member 83 is rocked, moving the roller toward the groove section Y and adjusting the cam 57 to retard the timing of its lifting the rock levers. As before explained, movement of the fuel control ring which moves the push rods into the deepest portion of the curved surfaces of the rock levers will result in plunger movement which will not close the ports 37. When the fuel control ring is moved adjacent its extreme clockwise adjustment, the push rods will ride up on the abrupt curved surfaces of the rock levers causing a maximum plunger stroke and maximum fuel charge volumes just as when at the other extreme adjustment, but instead of an early fuel delivery or timing the roller is in the Z section of the cam groove 84 which adjusts the eccentrics to place the slow cam behind the fast cam through the movement of the member 81 and the connecting rods and arms so that the latest timing results and also a several times more speedy movement of the fuel plungers than would be effected by the slower cam. This extreme clockwise adjustment of the fuel ring is made for starting the engine, and the resulting fast injection or high pressure behind the fuel, as well as late maximum fuel injections are instrumental in producing quick starting of a cold motor of the Diesel type when the crank shaft is being turned slowly.

It is to be noted that the above conditions and adjustments of the several control mechanisms are all responsive to the movement of a single manually operable regulating mechanism which is movable in a small range.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

What I claim is:

1. In an internal combustion engine of the compression-ignition type, a cylinder in which air charges are compressed, a device for injecting charges of oil into compressed air charges in the cylinder, engine driven mechanism for actuating said device to inject fuel charges, said mechanism being adjustable to vary the volume and timing of the charges delivered from the device, and control means movable in a range for adjusting the position of said mechanism, said device injecting a maximum fuel charge volume with an early timing when said control means is moved to one extreme of its range of movement and injecting a maximum fuel charge volume with a late timing when said control means is moved to the other extreme of its range of movement.

2. In an internal combustion engine of the compression-ignition type, a cylinder in which air charges are compressed, a device for injecting charges of oil into air charges in the cylinder, engine driven mechanism for actuating said device to inject charges of fuel therefrom, said mechanism being adjustable to vary the volume of the fuel charges in a range from zero to maximum and to concurrently vary the timing of the injections, and control means movable in a range for regulating the position of said mechanism, the position of said control means effecting a gradually decreasing volume charge and later timing when moved away from one extreme position and effecting a late timing and maximum volume charge when in the other extreme position.

3. In an internal combustion engine of the compression-ignition type having a plurality of cylinders in which air charges are compressed, a fuel injection device associated with each cylinder including a plunger the stroke of which determines the volume of the charges delivered, an actuating mechanism associated with each plunger for moving the same to effect injections from the devices, cam means for operating the mechanism, engine driven mechanism for rotating said cam means, a control member movable in a limited range and connected to regulate the adjustment of said plunger actuating mechanisms, said control member effecting a maximum fuel charge delivery at the extreme limits of its range and gradually reducing or increasing the fuel charge volume in its adjustment relative to one of the extreme limits, and connecting means between the control member and the engine driven mechanism, said connecting means adjusting the cam means to retard or advance the timing of the cam means in accordance with the fuel charge volume regulation and to delay the timing of the cam means to an extreme during one maximum volume adjustment.

4. In an internal combustion engine of the compression-ignition type having a cylinder in which air charges are compressed, a fuel injection device associated with each cylinder including a plunger, the stroke of the plunger determining the volume of the fuel charges delivered, a rocker lever having a curved bearing face, an articulated push rod structure engaging a bearing face of the rocker lever and the plunger, the curved bearing face of said rocker lever being formed to transmit a maximum effective plunger stroke when the push rod is engaging either end thereof and to transmit a variable lesser effective plunger stroke when the push rod is engaging intermediate the ends thereof, a regulating member for shifting the push rod relative to the rocker lever bearing face, and cam means associated to actuate the rocker lever.

5. In an internal combustion engine of the compression-ignition type having a cylinder in which air charges are compressed, a fuel injection device associated with each cylinder including a plunger, the stroke of the plunger determining the volume of the fuel charges delivered, a rocker lever having a bearing face, said face curving gradually lengthwise over the major portion and abruptly at one end, an articulated push rod engaging the rocker lever and the plunger, the section of the rod engaging the plunger being guided axially and the rod section engaging the rocker bearing face being adjustable lengthwise thereof, regulating means connected to the adjustable push rod section, and cam means associated to operate the rocker lever, the effective stroke of the plunger being greater when the rod is adjacent the ends of the rocker lever bearing face than when engaging between the ends thereof.

6. In a compression-ignition engine, cylinders in which air charges are introduced and compressed by pistons, a fuel injection device including a plunger associated with each cylinder, articulated tappets for actuating the plungers, rock levers having a curved bearing surface upon which the tappets engage, the movement of said tappets along the rock levers varying the fuel volume injected by the plungers from maximum when positioned at the ends of the faces to zero intermediate the ends of the faces, a pair of cams for operating the rock levers driven at relatively different speeds, and operative at different timings relatively when effective, and a control mechanism associated to place one of the cams in effective position, the faster cam being effective only when the tappets are at one end of their adjustment with the curved faces of the rock levers.

7. In an internal combustion engine, a cylinder in which air charges are compressed, a device for injecting charges of oil into the compressed air charges in the cylinder, and mechanism associated with said device for actuating the same, said mechanism including an adjustable lever for regulating the volume and timing of the fuel charges delivered from the device, maximum fuel charges delivered from the device with either an early or late timing occurring through adjustment of the actuating lever into extreme positions.

8. In an internal combustion engine having cylinders into which air charges are introduced and compressed, fuel injection devices for introducing charges of oil into the compressed air charges in the cylinders, actuating mechanism for the injection devices adjustable to control the volume of the oil charges, the adjustment of said mechanism in two positions causing maximum fuel delivery from the devices, mechanism for varying the timing of the injection of fuel charges from the devices, and interconnecting means between the actuating and timing mechanisms, said means adjusting the actuating and timing mechanisms in a manner to cause advanced timing of the fuel delivery when the actuating mechanism is in one of its positions causing maximum fuel delivery and retarded timing of the fuel delivery when the actuating mechanism is in the other position in which maximum fuel charges are delivered.

9. In an internal combustion engine of the compression-ignition type, a cylinder in which air charges are compressed, a device for injecting charges of oil into compressed air charges in the cylinder, mechanism for actuating said device, said mechanism being adjustable to vary the volume and timing of the charges delivered from the device, and control means for adjusting said mechanism including a lever, said device injecting a maximum fuel charge volume with different timing upon adjustment of said control lever.

HERBERT C. EDWARDS.